United States Patent
Cavarra et al.

(10) Patent No.: US 10,911,860 B2
(45) Date of Patent: Feb. 2, 2021

(54) AUTOMATED AND BODY DRIVEN HEADSET AUDIO CONTROL

(71) Applicant: Intel Corporation, Santa Clara, CA (US)

(72) Inventors: Chiara Cavarra, Dublin (IE); Marco Chiappero, Dublin (IE)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 15/078,783

(22) Filed: Mar. 23, 2016

(65) Prior Publication Data

US 2017/0280223 A1   Sep. 28, 2017

(51) Int. Cl.
*H04R 1/10* (2006.01)
*G06F 3/16* (2006.01)
(Continued)

(52) U.S. Cl.
CPC ........... *H04R 1/1041* (2013.01); *G06F 1/163* (2013.01); *G06F 1/1694* (2013.01);
(Continued)

(58) Field of Classification Search
CPC ...... G06F 1/163; G06F 1/1694; G06F 1/1698; G06F 2203/04101; G06F 3/011; G06F 3/03547; G06F 3/044; G06F 3/165; H04R 1/1008; H04R 1/1041; H04R 2420/07; H04R 2420/09
See application file for complete search history.

(56) References Cited

U.S. PATENT DOCUMENTS

| | | | |
|---|---|---|---|
| 2005/0037823 A1* | 2/2005 | Seshadri | H04M 1/05 455/575.6 |
| 2005/0221791 A1 | 10/2005 | Angelhag | |

(Continued)

FOREIGN PATENT DOCUMENTS

| | | |
|---|---|---|
| KR | 101362334 | 2/2014 |
| WO | WO-2017165053 A1 | 9/2017 |

OTHER PUBLICATIONS

"International Application Serial No. PCT/US2017/018899, International Search Report dated May 16, 2017", 3 pgs.

(Continued)

*Primary Examiner* — Kenneth Bukowski
(74) *Attorney, Agent, or Firm* — Schwegman Lundberg & Woessner, P.A.

(57) ABSTRACT

Various techniques for performing automated detection and control of audio-based conditions for headsets and like wearable audio devices are disclosed herein. In an example, an audio headset device includes at least one sensor to collect sensor data and processing circuitry to detect an applicable audio control condition, based on the sensor data, to cause control of the audio to be output from the headset device. Also in an example, a computing device includes an audio control processing component to receive and process sensor data collected from a headset audio device and identify a control action in a software application, to cause control of audio to be output to the headset. Further examples to enable simplified, dynamic audio controls for the operation of a headset device and a connected computing device are also disclosed.

25 Claims, 7 Drawing Sheets

(51) Int. Cl.
 G06F 3/044 (2006.01)
 G06F 3/01 (2006.01)
 G06F 1/16 (2006.01)
 G06F 3/0354 (2013.01)
(52) U.S. Cl.
 CPC ............ *G06F 1/1698* (2013.01); *G06F 3/011* (2013.01); *G06F 3/03547* (2013.01); *G06F 3/044* (2013.01); *G06F 3/165* (2013.01); *G06F 2203/04101* (2013.01); *H04R 1/1008* (2013.01); *H04R 2420/07* (2013.01); *H04R 2420/09* (2013.01)

(56) References Cited

U.S. PATENT DOCUMENTS

| | | |
|---|---|---|
| 2008/0211768 A1 | 9/2008 | Breen et al. |
| 2009/0010461 A1 | 1/2009 | Klinghult et al. |
| 2009/0176540 A1 | 7/2009 | Do et al. |
| 2012/0002822 A1* | 1/2012 | Peissig ............... G06F 3/012 381/74 |
| 2012/0230509 A1* | 9/2012 | Hagglund ............ H04R 1/1041 381/74 |
| 2013/0038458 A1* | 2/2013 | Toivola ................. H04M 1/05 340/665 |
| 2015/0215719 A1 | 7/2015 | Turgul |
| 2015/0268721 A1* | 9/2015 | Joo .................... G02B 27/0093 345/156 |
| 2016/0100244 A1* | 4/2016 | Gentile ............... H04R 1/1041 345/174 |
| 2016/0150311 A1* | 5/2016 | Bremyer ............. H04R 1/1008 381/371 |
| 2017/0075422 A1* | 3/2017 | Sun ..................... H04R 1/1041 |
| 2017/0094411 A1* | 3/2017 | Peterson ............... H04R 5/033 |
| 2017/0223162 A1* | 8/2017 | Wilder ................ H04M 1/6066 |

OTHER PUBLICATIONS

"International Application Serial No. PCT/US2017/018899, Written Opinion dated May 16, 2017", 8 pgs.

"More than meets the ear", Sony Mobile Communications, [Online]. Retrieved from the Internet: <URL: http://www.sonymobile.com/globalen/productstsmartwear/xperiaear/#specifications, (2016), 9 pgs.

"International Application Serial No. PCT/US2017/018899, International Preliminary Report on Patentability dated Oct. 4, 2018", 10 pgs.

* cited by examiner

US 10,911,860 B2

AUTOMATED AND BODY DRIVEN HEADSET AUDIO CONTROL

TECHNICAL FIELD

Embodiments described herein generally relate to the control and operation of electronic devices and, for some examples, the control and operation of wearable audio devices including audio headsets, speakers, microphones, and like audio input/output devices.

BACKGROUND

Headphone units (also referred to as earspeakers, earphones, or earbuds) are widely used to provide audio output to a human user from an electronic device. Some existing headphone units are provided as stereo headsets that are designed to provide audio isolation, especially in noisy environments. However, most headsets are commonly designed for one purpose, to provide a simple audio output. Some existing headsets also provide limited controls in the form of buttons (e.g., volume control buttons to increase or decrease audio output volume) that are specific to the design of the headset.

As a result, user control of the audio to be output from a headphone unit is often specific to the design of the headset or the electronic device that is generating the audio output. Muting, pausing, stopping, or altering the characteristics of the audio output often requires physical access to the originating electronic device to access playback controls. Wide variation also exists in the playback user interfaces that are used to control audio outputs, with varying degrees of speed, usability, and skill being required to control the audio outputs. This requires extra effort for the user to remember the specific steps for the task and often leads to additional response delay.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
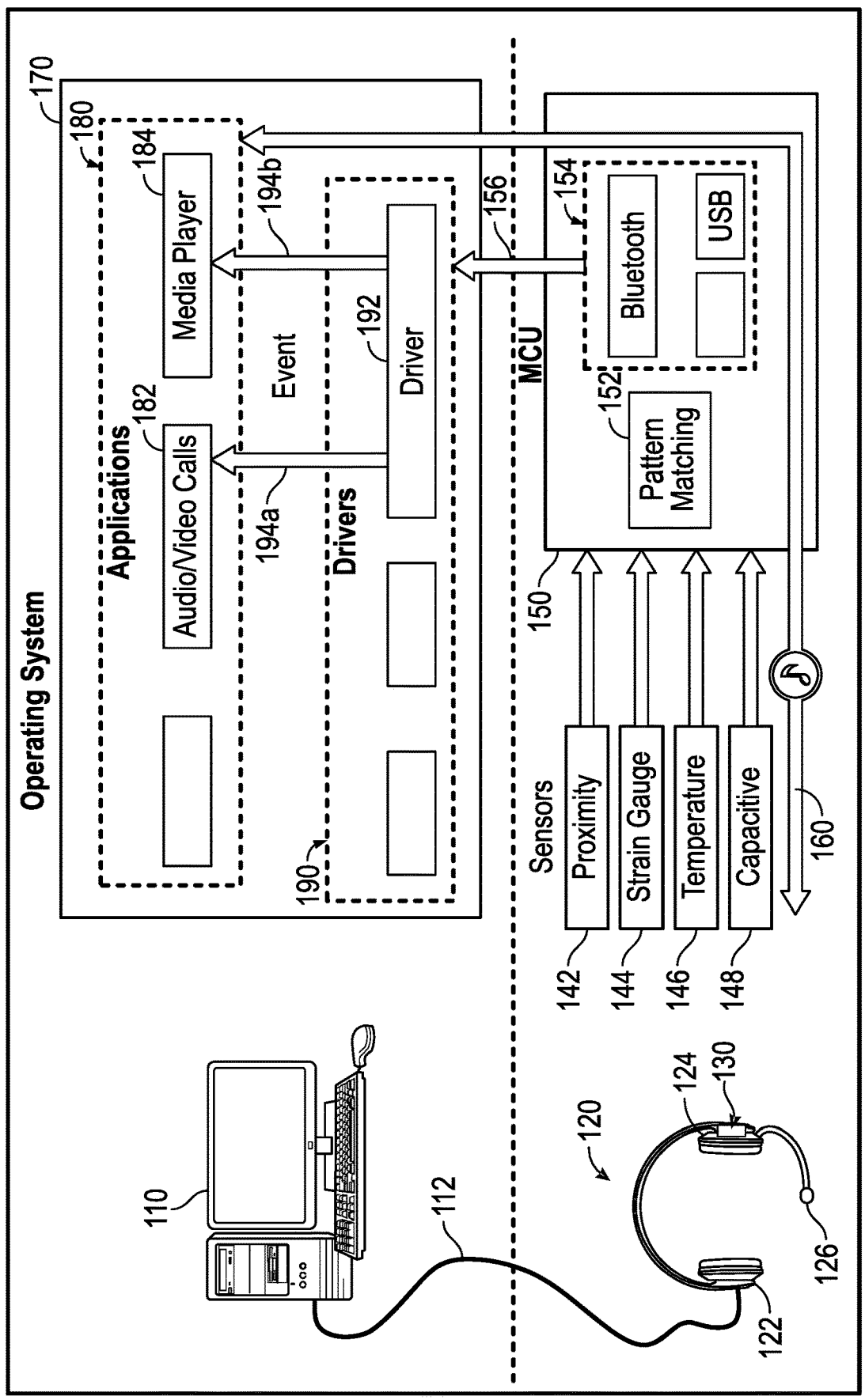
FIG. 1 illustrates an overview of sensor data processing and communication among a computing device and a headset device for audio output control, according to an example.

In the following description, methods, configurations, device components, and related apparatuses are disclosed that provide automated detection and control of audio-based conditions for headsets and like audio input/output devices. Specifically, the following description includes various examples of intuitive, user- and body-driven actions that result in the control of audio inputs and outputs with a headset and a connected computing device. As a result, the following techniques enable the partial or complete automation of audio controls from common human activities occurring with the headset, the computing device, and other devices and sensors worn by (or proximate to) the human user.

In an example, the presently described techniques and configurations are applied to provide simplified, dynamic audio controls for the operation of a headset device or a computing device (or both devices), based on the use of sensors incorporated into the headset device. These sensors may include gesture detection sensors such as a capacitive sensor that is configured to detect gesture actions such as finger movements; environmental detection sensors such as a proximity sensor, accelerometer, gyroscope, temperature sensor, strain gauge, and the like; or the use of environmental or gesture detection sensors to detect arm movements, head movements, and the like, being made by the human user. As a result, specific gestures such as a finger tap received on a headphone may be associated with an intuitive audio action such as pause playback, and an action such as the removal of the headphones may be associated with an intuitive audio action such as stop playback or mute microphone.

In an example, techniques are disclosed to enable simplified controls for the audio input and output of a headset device. In addition, the following techniques make it possible to automate (partially or completely) these controls. Such automated control may be implemented by sensors installed in an audio output device that may determine the state of the audio output device with respect to user actions (e.g., user gestures and movements) or with respect to the surrounding environment (e.g. the current position of the device). The data for such sensors may be conveyed to an audio source (e.g., a computing device) by wired or wireless communication protocols such as USB or Bluetooth. This sensor data may then be used to identify and trigger standard or custom operations for audio control with minimum effort from the human user.

As further discussed herein, techniques are disclosed to provide for integration, processing, and use of information from sensors for new and simplified uses of audio devices. The types of uses may include: detection of a human user's listening or talking status, in response to the position of a headset on the human user; the enabling or disabling of a microphone, in response to standardized gestures; the enabling or disabling of an audio output, to pause or stop an audio feed or lower the volume, in response to moving the headset away from the human user's wearing position; and the adjustment of an audio control parameter such as volume, playback, rewind, or fast-forward as a result of other detected sensor inputs (such as physiological input from another wearable device or a notification from a computing device). These and similar uses cases may lead to improved interaction and control of audio playback and recording, and associated technical benefits for reduced system resources.

Compared to the existing state of the art, the techniques described herein enable automated and contextual controls of an audio source, in contrast to the manual human control that would need to occur with existing hardware. The human control that is needed with existing systems also has usability implications. For instance, if a user is wearing an audio headset, any interaction to communicate with other people is disruptive and requires an expensive intervention from the user to halt the sound stream, and subsequently recover from the point where the pausing happened (if even possible). Further, in many audio devices, controls such as muting, stopping, or simply altering the audio stream requires physical access to the originating device. The user interface of the originating device such as a phone or computer is often device specific, with varying degrees of speed and usability to accomplish certain tasks; stopping or pausing the audio output from the computing device requires extra cognitive effort to remind the specific steps for the task and often leads to additional response delay. The following techniques for automated and body-driven user control serve to provide an accurate and easy-to-control mechanism for software and electronic operations occurring on the headset and the computing device.

FIG. 1 illustrates an overview of sensor data processing and communication among a computing device 110 and a headset device 120 for audio output control, according to an example. As shown, processing operations of the computing device 110 are depicted in relation to an operating system 170 and software applications 180 and drivers 190 executed with the operating system of the computing device 110. Likewise, control processing operations of the headset device 120 are depicted in relation to a set of sensors 142, 144, 146, 148 and a microcontroller unit (MCU) 150. It will be understood that additional components and circuitry not depicted in FIG. 1 may be used to implement the following data processing and communication techniques.

The computing device 110 may be a desktop or notebook personal computer (PC), a tablet, a smartphone, a thin client device, or other form factor including an integrated or separate display screen. The computing device 110 may be communicatively coupled to the headset device 120 through a wired connection 112 (e.g., a headphone wire or USB cable) that communicates an analog or digital signal, or through a wireless connection (not shown) that communicates a digital signal. The applicability of the present technique may apply to any number of digital, analog, wired, or wireless communication mechanisms between the headset device 120 and the computing device 110.

The headset device 120 may include a first speaker 122 and a second speaker 124, such as to provide stereo (left channel and right channel) audio outputs of the audio signal received with the connection 112. The headset device 120 may include a microphone 126, such as to capture human voice as an audio input. The headset device 120 may also include a circuitry unit 130 housing all or a portion of the set of sensors (e.g., the sensors 142, 144, 146, 148) and processing circuitry (e.g., the MCU 150). However, the sensors or portions of the processing circuitry may be located in other areas of the headset device 120. In other examples, the headset device 120 may include a single speaker.

The headset device 120 may include a set of integrated sensors (e.g., integrated within the housing, assembly, or unit of the headset device 120) including a proximity sensor 142, a strain gauge sensor 144, a temperature sensor 146, and a capacitive sensor 148. The sensor data produced from among the respective sensors may be communicated to the MCU 150. Other types of sensors not depicted in FIG. 1, such as an accelerometer, gyroscope, or the like, may also be implemented within the headset device 120. Although FIG. 1 depicts the inclusion of four sensors, in other examples, a fewer or larger number of sensors may be provided.

The MCU 150 may include microcontroller circuitry designed for use in a standalone wearable device (including battery-powered or USB/wired-powered wearable devices) to perform limited (and specialized) data processing tasks. For example, the MCU 150 may include a pattern matching engine 152 configured to process sensor data and identify certain operational conditions from sensor data patterns, and communication circuitry 154 to provide communication 156 with the computing device 110 via a Bluetooth or USB connection (or like wired or wireless communication protocols). Bluetooth and USB are two commonly used examples of standard and extensible protocols that may be handled by basic and embedded oriented CPUs. Bluetooth and USB are both capable of conveying audio streams and accepting discrete inputs from standard devices, thus allowing wired and wireless implementation of headset audio control processing with the present techniques.

Based on the number of sensors and the data processing involved, the MCU 150 may perform the operations to process the sensor data directly at the headset device 120, or the MCU 150 may relay the sensor data to the computing device 110 for processing. Further, the processing of the sensor data with a pattern matching engine 152 may be used to identify user habits and programmable action combinations (and identifiable events and conditions). Thus, the MCU 150 may provide a hardware-based identification and response of sensor conditions and events that correspond to certain audio control scenarios, and further software processing may occur in the computing device 110 as a result of the transmission of these sensor conditions and events with the communication 156.

The MCU 150 may also be involved with communication of the audio channel 160 from the computing device 110 (or other audio source) for headset audio output (such as output via the first speaker 122 and the second speaker 124). The MCU 150 may also be involved with the communication of the audio channel 160 that includes headset audio input (such as received via the microphone 126) to the computing device 110 (or other audio sink). Thus, the present automated audio control techniques may be applied with use of a variety of audio input and output configurations.

The operating system 170, the software applications 180, and the drivers 190 operate on the computing device 110 to generate and receive audio signals via the audio channel 160, such as with playback and capture of audio with an audio/video call application 182 or a media player application 184. The MCU 150 of the headset device 120 may communicate information of the sensor conditions or the software control actions via the communication 156, received and processed by a driver 192 for the headset device 120. For example, the sensor data may be correlated to one or more events provided for control of the software applications, such as a first event 194a (e.g., a mute event) to control an audio input or output aspect of the audio/video call application 182, or a second event 194b (e.g., stop event) to control an audio input or output aspect of the media player application 184.

In an example, standardized device drivers (e.g. emulating a keyboard containing multimedia keys or hotkeys) may be reused for processing of the headset audio data events. However, custom drivers may be implemented to address more elaborated operations and data processing. Further, the present techniques may be used with Bluetooth and USB protocols and other protocol-specific implementations (including standardized implementations) to support additional headset data processing techniques.

In an example, a combination of the sensor data from among multiple of the sensors 142, 144, 146, 148 may be evaluated in combination to determine whether the human user is wearing (or how the human user is using) the headset device 120. Likewise, a combination of the sensor data or detected conditions may be used to determine whether to implement a software control action (such as triggered with events 194a, 194b) to stop or pause one of the software applications 180 that is providing content to the audio output device. Variations to the audio control parameter and playback control parameter may be provided depending on the type of software application, the type of sensor, and like differences of the device.

Although FIG. 1 depicts the inclusion of sensors and processing units directly within an audio device (such as within the housing of an audio headset), in further examples, the sensors and processing unit may be an add-on module for an existing headphone set. For example, an add-on module including gesture sensing circuitry may be added to an exterior of a housing of a headphone set that does not include built-in audio controls. As also discussed in the following examples, sensors may vary in quantity, type, and positioning. Accordingly, sensors may work independently or in combination, and could sense concurrently in various environments (including the sensing of user or device movements or a combination of all of the above).

Figure 2:
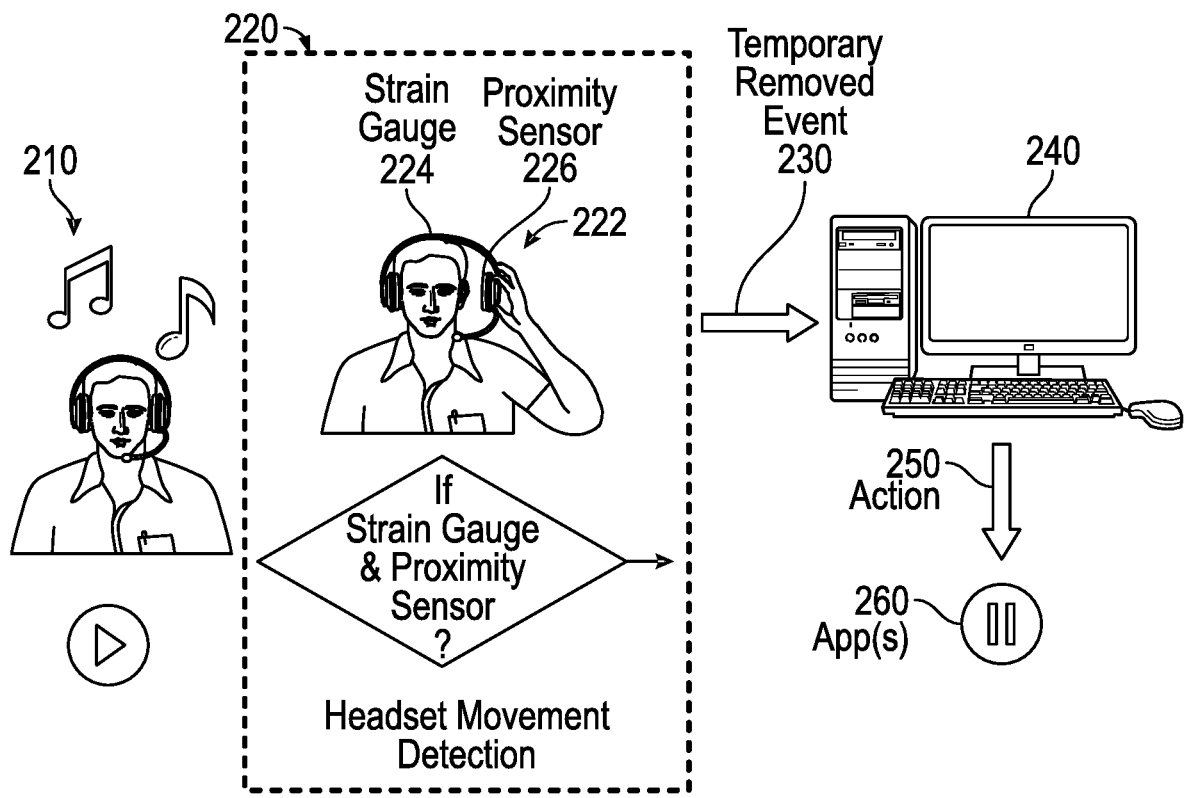
FIG. 2 illustrates a use case scenario of detected headset movement with a headset device and a computing device implementing automated audio output control, according to an example.

FIG. 2 illustrates a use case scenario of detected headset movement with a headset 222 and a computing device 240 implementing automated audio output control, according to an example. As shown, FIG. 2 first illustrates an audio playback 210 to a human user with the headset 222, followed by a movement of the headset 222 in the form of the human user extending (e.g., flexing) one side of the headset 222 from a contracted (e.g., fully worn) position to a partially contracted (e.g., partially worn) position. As a result of the movement of the headset 222, a headset movement detection 220 protocol is performed by logic circuitry of the headset 222 or the computing device 240 connected to the headset.

The headset 222 is configured to include multiple sensors (e.g., sensors integrated into the headset 222) including a strain gauge 224 and a proximity sensor 226, each of which collect sensor data during the use of the headset 222. For example, the strain gauge 224 that is located on the arch of the headset 222 may provide a series of data measurements that indicate when the headset 222 is in a first position (e.g., a retracted or fully worn position) and stretched to in a second position (e.g., an extended or partially worn position). The proximity sensor 226 may provide a series of data measurements that indicate whether one or multiple areas of the headset 222 is located in proximity to a user's body (e.g., when a speaker of an earpod is positioned next to a user's head). The data from the strain gauge 224 and the proximity sensor 226 may be provided to a logic function operating on the headset 222, to determine if the strain gauge and proximity sensor meet a sensor data condition (e.g., a predefined condition), and headset movement is detected if the sensor data condition is met. In further examples, the headset movement detection 220 protocol may be coordinated with data combined from multiple types of environmental sensors, including proximity and temperature sensors in addition to or in place of sensor data from the strain gauge sensor.

In response to the detection of the headset movement, a temporarily removed event 230 may be generated by the headset 222 and communicated from the headset 222 to the computing device 240. In response to the temporarily removed event 230, the computing device 240 may perform a predefined or custom action 250 upon a software application, execute an operating system function, provide hardware control or management, or like actions. For example, the action 250 may include implementing a pause command to an audio playback software application 260 (e.g., a music or video player or other audiovisual software program) executing on the computing device 240. In further examples, the action 250 may result in other commands being relayed to other devices. The logic to determine the appropriate action to perform may be executed by processing circuitry of the headset 222, the computing device 240, or a combination of these or other devices.

In an example, data and conditions from other sensors of the headset 222 or the computing device 240 may be used as pre- or post-processing techniques for the temporary removed event 230. A microphone or noise level sensor may be used for measuring the external level of noise, such as to determine (and apply) corrections on the output level occurring during temporary removal of the headset 222.

Figure 3:
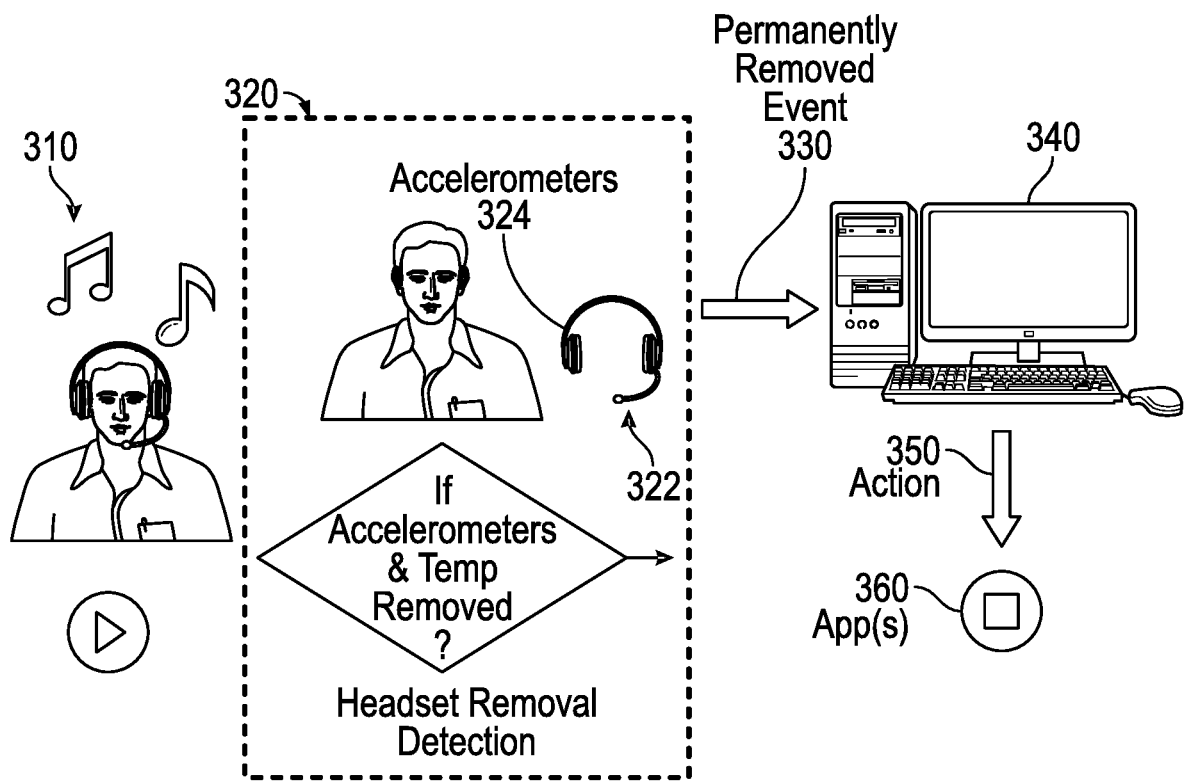
FIG. 3 illustrates a use case scenario of detected headset removal with a headset device and a computing device implementing automated audio output control, according to an example.

FIG. 3 illustrates a use case scenario of detected headset removal with a headset 322 and a computing device 340 implementing automated audio output control, according to an example. As shown, FIG. 3 illustrates an audio playback 310 to a human user with a headset 322, followed by a movement of the headset 322 in the form of the human user moving the headset 322 from a fully worn position to an entirely removed position (e.g., entirely removed from the human user's head). During the movement of the headset 322, a plurality of accelerometers 324 located in the headset 322 detect an accelerative force that exceeds a certain threshold. For example, accelerometer data may be used to track movements of the user's head or to determine if the headset 322 is lying flat on a table. As a result of the detection of the accelerative force, a headset movement detection 320 protocol is performed by logic circuitry of the headset 322 or the computing device 340 connected to the headset.

The headset 322 is configured to include sensors including the accelerometers 324 to collect motion data during the use of the headset 322. For example, the accelerometers 324 may provide a series of data measurements that indicate when the headset 322 is moved from a first orientation (e.g., fully worn position) to a second orientation (e.g., a fully, not-worn position). A proximity sensor, temperature sensor, or infrared sensor may also be used to provide a series of data measurements that indicate whether one or multiple areas of the headset 322 is located in proximity to a user's body (e.g., a higher temperature when next to a user's head).

The data from the accelerometers 324 and the temperature sensor may be provided to a logic function operating on the headset 322, such as to detect headset removal if the accelerometer data and the temperature sensor data meets a predefined condition.

In response to the detection of the headset movement, a headset removal event 330 may be communicated from the headset to the computing device 340. In response to the headset removal event 330, the computing device 340 may perform a predefined or custom action 350 upon a software application, execute an operating system function, provide hardware control or management, or like actions. For example, the action 350 may implement a stop command to an audio playback software application 360 (e.g., a music or video player or other audiovisual software program) executing on the computing device 340. In further examples, the action 350 may result in other commands being relayed to other devices. The logic to determine the appropriate action to perform may be executed by processing circuitry of the headset 322, the computing device 340, or a combination of these or other devices. Further, the logic for detection of the headset removal may be used in combination with the temporary removal logic depicted in FIG. 2.

Figure 4:
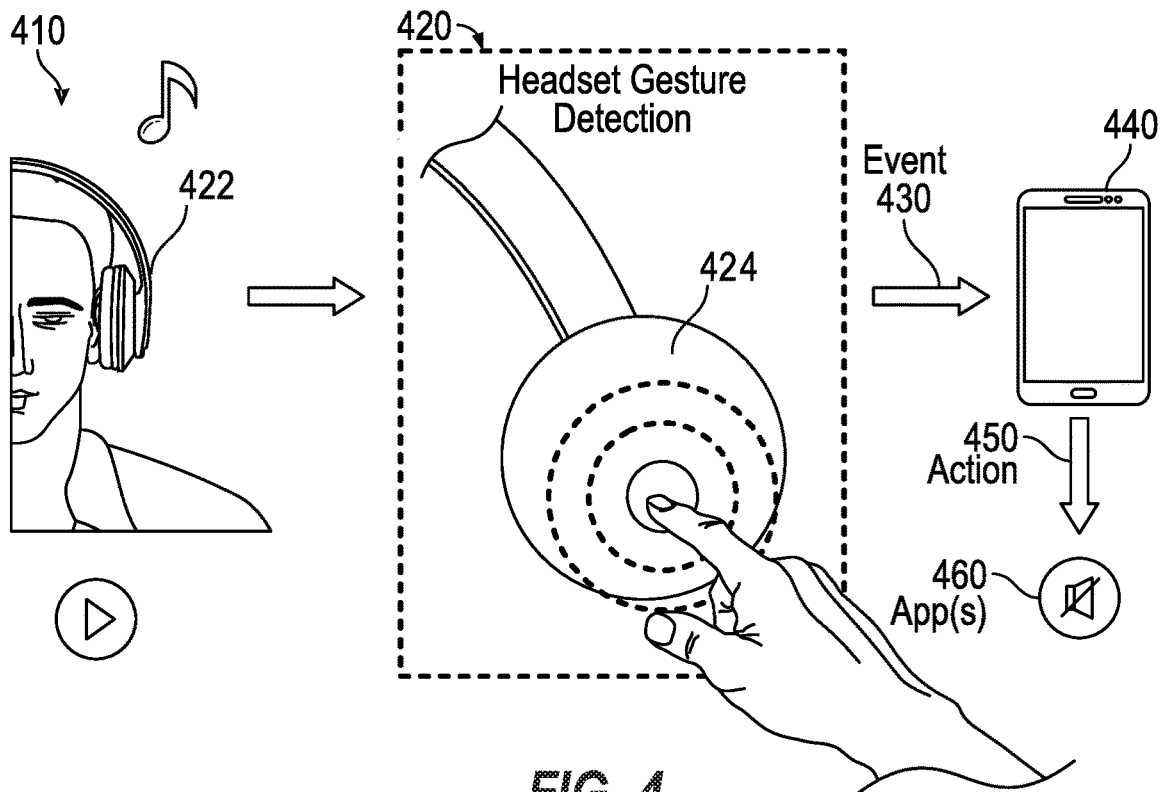
FIG. 4 illustrates a use case scenario of detected headset gestures with a headset device and a mobile computing device implementing automated audio output control, according to an example.

FIG. 4 illustrates a use case scenario of detected headset gestures with a headset device 422 and a mobile computing device 440 implementing automated audio output control, according to an example. As shown, FIG. 4 illustrates an audio playback 410 to a human user with a headset 422, for a headset device that includes a gesture detection component. The gesture detection component, such as a capacitive touch sensor, may be used to detect and initiate a headset gesture detection protocol 420, performed by the logic circuitry of the headset 422 or a computing device (e.g., mobile computing device 440) connected to the headset.

The gestures may be performed directly on a housing of the headset 422, such as on an earpad unit 424 of the headset 422 that includes a touch sensor. For example, a capacitive sensor for detecting the gesture may be included within the housing of the earpad unit or other portions of the headset 422. In response to the detection of the headset gesture with the headset 422, a gesture event 430 may be communicated from the headset to the mobile computing device 440. In response to the gesture event 430, the mobile computing device 440 may perform a predefined or custom action (such as a mute volume action 450) upon a software application, execute an operating system function, provide hardware control or management, or like actions. For example, if the gesture event 430 occurs from a single tap that corresponds to a "mute" gesture, then the mobile computing device 440 may implement the "mute volume" action 450 that causes a muting/unmuting command to be implemented with an audio playback software application 460 (e.g., a music or video player or other audiovisual software program) executing on the mobile computing device 440.

In an example, other gestures may be defined with the headset gesture detection protocol 420 to perform volume control, including muting and unmuting (such as with a single, quick tap gesture), pausing (such as a two finger tap gesture), turning the volume up or down (such as with a circular touch gesture), fast forward/rewind or next song/ previous song (such as with a swipe forward or swipe backward gesture, or circular forward or circular reverse gesture), and the like.

In addition to a capacitive touch sensor, infrared sensors and other forms of gesture motion detectors may be used to recognize specific movements and gestures. For example, a sensor may be implemented in the headset 422 to control volume with a virtual "volume knob" without actually touching the earpad unit 424. In further examples, individual users or software applications may define custom gesture inputs for a device, or correlate a specific gesture (or gesture-sensor input) to a specific software application or device processing response.

Figure 5:
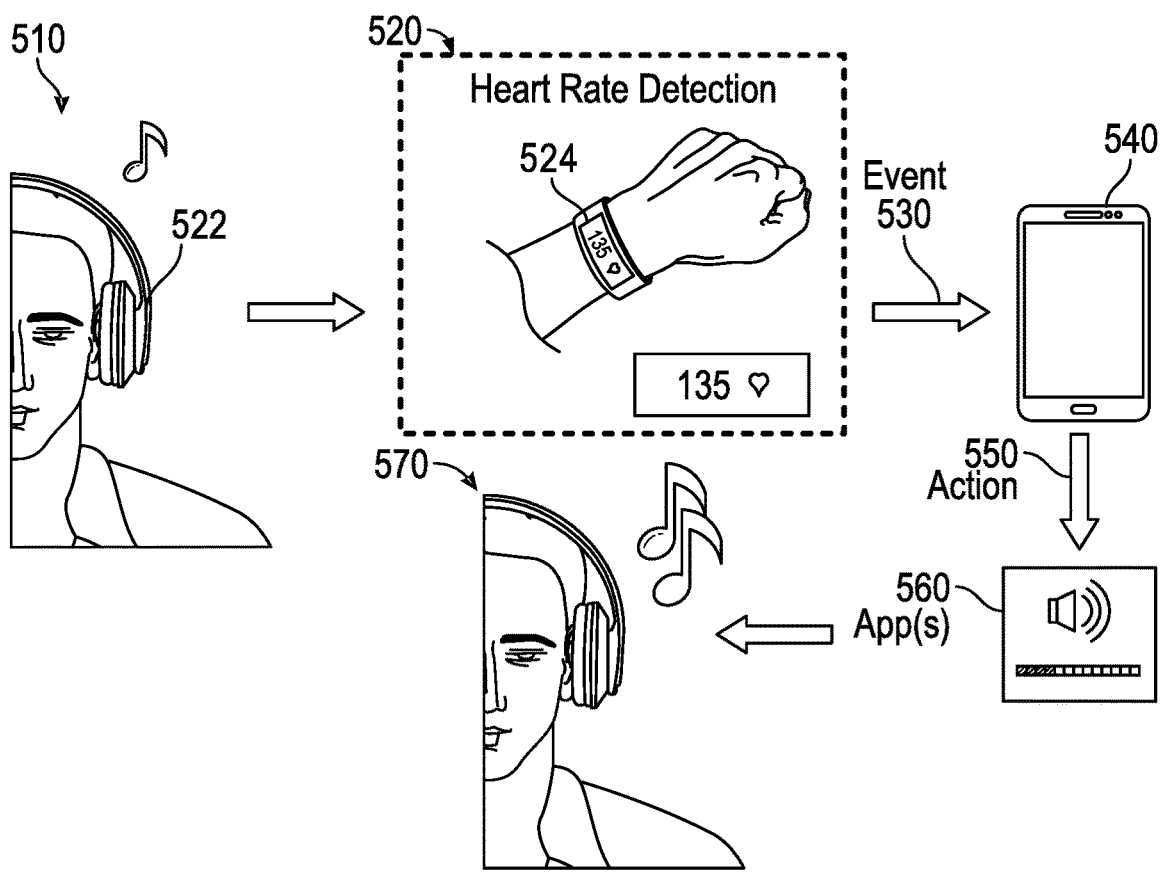
FIG. 5 illustrates a use case scenario of a detected wearable device condition for a headset device and a mobile computing device implementing automated audio output control, according to an example.

FIG. 5 illustrates a use case scenario of a detected wearable device condition for a headset 522 and a mobile computing device 540 implementing automated audio output control, according to an example. As shown, FIG. 5 illustrates an audio playback 510 to a human user with a headset 522, for a headset that includes a gesture detection component. Additionally, the human user is wearing another wearable device 524 (e.g., a smartwatch or band) that is used to collect physiological data including a heart rate. The combination of the data collected among the headset 522 and the wearable device 524 may be used to detect and initiate a heart rate detection protocol 520, performed by the logic circuitry of the headset 522 or the wearable device 524 or the mobile computing device 540 connected to the wearable device.

For example, if a heart rate is detected with the wearable device 524 to exceed a certain threshold (e.g., indicative of extensive exercise such as running), data for a heart rate event 530 may be communicated to the mobile computing device 540. As a result, the mobile computing device 540 may implement a volume control action 550 that causes a volume control command to be implemented with the operating system or the audio playback software application 560 (e.g., a music or video player or like audiovisual software program) executing on the mobile computing device 540. For example, the audio being output from the application 560 to the headset 522 may increase (as shown with audio playback 570) to compensate for the exercise activity.

Integration with other wearable devices may be provided in a variety of fashions. For example, a wearable device that detects a pulse or other types of physiological data may be used to automatically change the audio volume, a song selected, whether to resume or pause audio, and the like. Further, the data from this type of a wearable device may be coordinated with data being captured with the headset and other status information from the computing device.

The types of commands that are provided from a headset device to a computing device (and the operating system of the computing device) may enable automated control scenarios of varying complexities. For example, if the headset device sends an event or condition input to the computing device indicating "headphones removed, stop the audio application," then the computing device may decide whether to stop the program, pause the program, or perform other automated operations. As another example, if raw or composite sensor data is communicated from the headset device to the computing device, the computing device may perform analysis (including evaluating the context of the audio output) to determine what command to automatically perform. This determination may be performed by the operating system or respective software applications executing in the computing device.

In further examples, vendors may provide additional application layer software to process headset sensor data with customized rules and conditions (including predefined conditions). In still other examples, vendors may provide device driver functionality to process the events with customized rules for actions and logic that are specific to the headset device communications. Additionally, the sensor data from the audio device may be related to a third party service (such as an internet connected service) to determine what action to automatically perform (or to present an available option to a user to implement further control).

Figure 6:
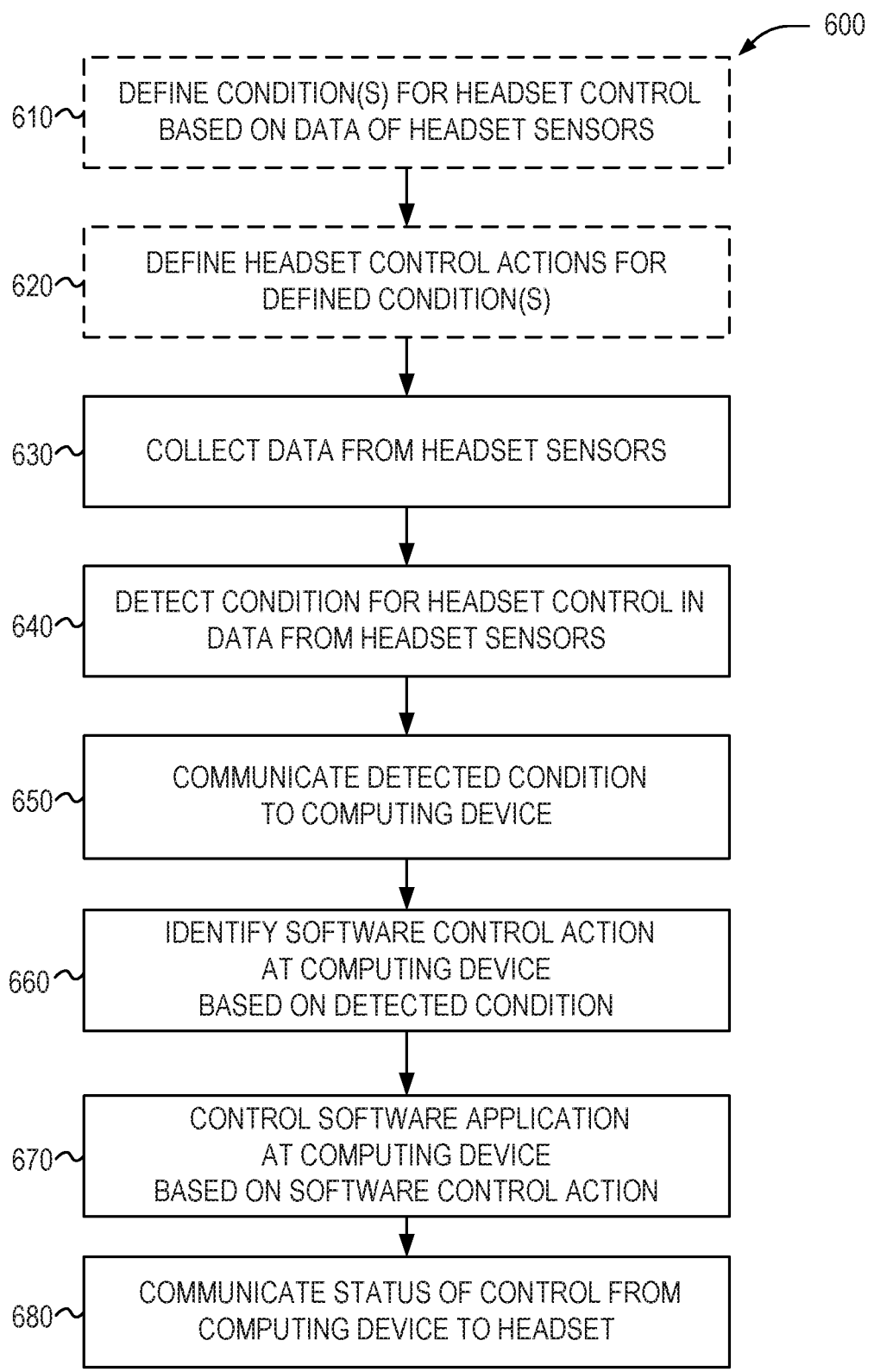
FIG. 6 illustrates a flowchart of a method for detecting a headset control condition at a headset device and implementing automated audio output control at a computing device in response to the headset control condition, according to an example.

FIG. 6 illustrates a flowchart 600 of a method for detecting a headset control condition at a headset device and implementing automated audio output control at a computing device in response to the headset control condition, according to an example. In an example, the method of flowchart 600 is executed by a system including a headset and a computing device. However, it will be understood that the following techniques may be modified for additional processing actions at the headset or the computing device.

As shown, the flowchart 600 includes operations for establishing a definition of one or more conditions for headset control (operation 610) and establishing a definition of one or more headset control actions for the respective conditions (operation 620), which in some examples are optional. For example, the definitions may be pre-programmed or pre-defined into capabilities of a headset, operating system, or software applications; in other examples, users may customize and define the relevant conditions and control actions.

The flowchart 600 continues operation with the collection of sensor data from the headset sensors (operation 630), including the collection of movement and environmental sensor data from sensors such as an accelerometer, strain gauge sensor, and the like as discussed above. The sensor data is then evaluated to detect a condition for headset control (operation 640). For example, pattern matching may be performed to determine whether a pattern of movement or a threshold strain gauge value indicates that the headset is being removed, moved, or worn by a human user.

This detected sensor condition is then communicated to the computing device or other audio source that provides the audio stream (operation 650). For example, the sensor condition may be correlated to a headset removal or movement event. Based on the communicated sensor condition, a particular software control action is identified or determined for execution at the computing device (operation 660) and the software application (e.g., an audiovisual software application) is controlled with execution of the particular software control action (operation 670). This control may occur in an automated fashion, to implement the operation without real-time user control or influence. Subsequently, an optional indication of the control status may be communicated back to the headset (operation 680), such as in the form of an acknowledgement that the audio control command has been received or implemented.

Other automated and dynamic actions to the computing device may be implemented as a result of the detected scenario. For example, a computing device might be entered into a "locked" mode in response to detecting that the headset device is removed; user-contextual actions in a software application, the operating system, or the computing device may be detected or customized based on contextual gestures or sensor information from the headset device. Likewise, the audio headset device may be used to provide an accurate state of information in comparison other wearable devices, such as to detect or verify whether the user's state is walking, sitting, exercising, and the like.

Figure 7:
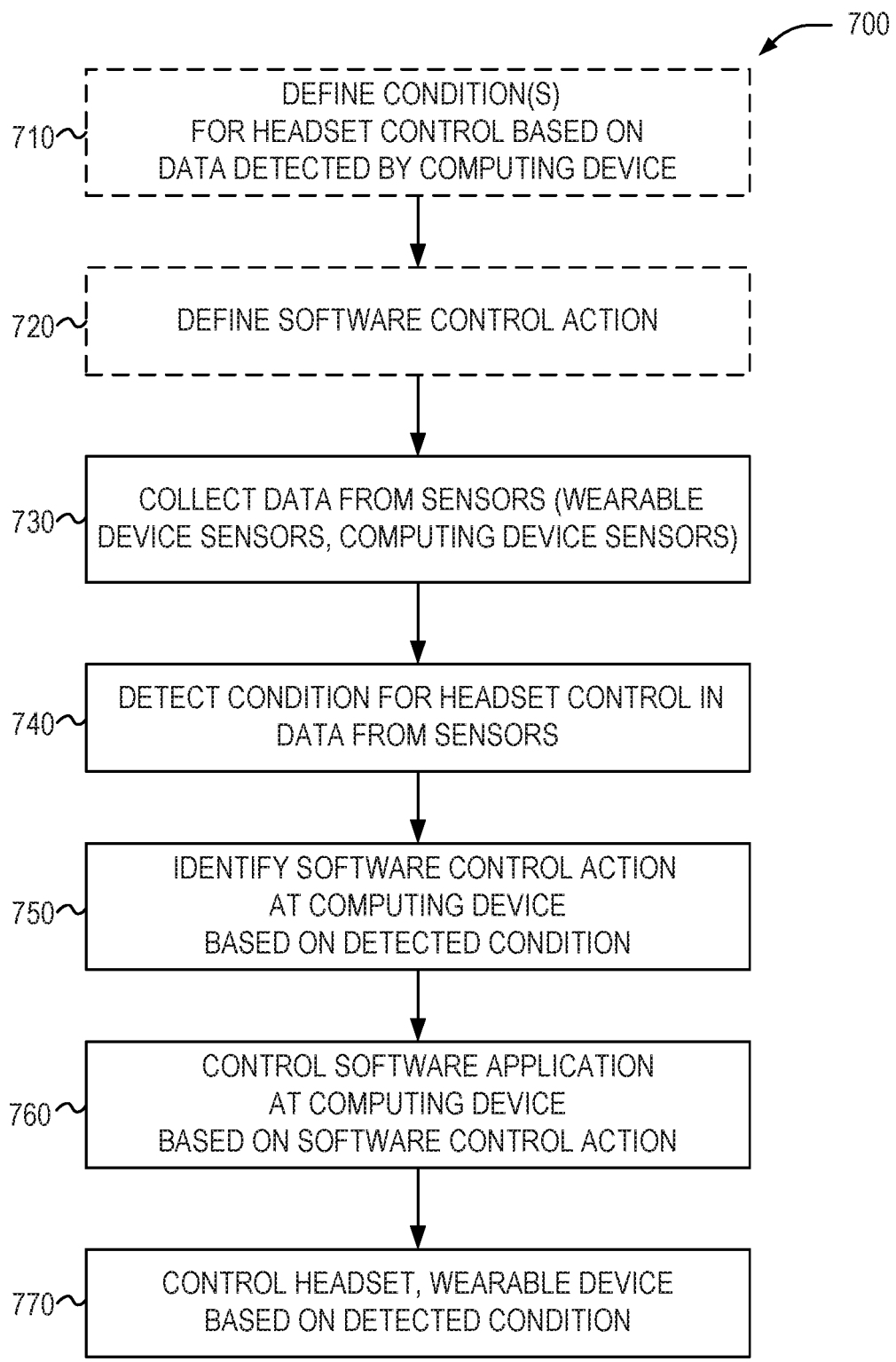
FIG. 7 illustrates a flowchart of a method for capturing sensor data at a sensing device and implementing automated audio output control at a computing device in response to the sensor data, according to an example.

FIG. 7 illustrates a flowchart 700 of a method for capturing sensor data at a sensing device and implementing automated audio output control at a computing device in response to the sensor data, according to an example. In an example, the electronic operations of flowchart 700 are executed by a computing device such as a mobile computing device (e.g., smartphone or tablet) that is receiving data from the audio headset device, and from additional wearable devices in further examples. However, it will be understood that some of the electronic operations may be distributed to the audio headset device, one or multiple wearable devices, remote services (e.g., cloud services), and the like.

As shown, the flowchart 700 includes operations for establishing a definition of one or more conditions for automated headset control (operation 710) and a definition of one or more software control actions (operation 720) that may occur in the mobile computing device in response to the conditions, which in some examples are optional. As discussed in FIG. 6, this may be provided from pre-programmed or pre-defined capabilities of a headset, operating system, or software applications, or users may customize and define such conditions and control actions.

The flowchart 700 continues operation with the collection of sensor data from a plurality of sensors (operation 730), such as a combination of data from a headset device, other wearable devices, or sensors of a computing device. The sensor data from the plurality of sensors is then evaluated (e.g., with the computing device) to detect a condition for headset control or other audiovisual output control (operation 740). A variety of sensor data processing mechanisms may be used to detect the condition, including pattern matching, threshold and state evaluations, classifications, rule processing, and the like.

This detected sensor condition is then further processed by the computing device to identify one or more software control actions to perform on the computing device (operation 750), such as software control actions in an operating system or an audiovisual software program executing on the computing device that control the audio output (or input) from the operating system or the audiovisual software program. The software control actions then may be automatically performed on the computing device, or performed in response to another condition (such as additional user input), thus causing control of the software application (operation 760). Additional operations may follow to communicate the status of the control of the software application or to cause other control of the headset or another wearable device based on the detected condition (operation 770).

In a further example, audio output of the headset device may be customized to reverse the orientation of the audio playback, based on sensor data which indicates that the headphones are being worn in a backward or reverse orientation. For example, if a movement sensor indicates that the user is walking while wearing the opposite audio output orientation (e.g., the right speaker over the user's left ear and the left speaker over the user's right ear), then the headset device or the connected computing device may reverse the channels of the audio output. As another example, the left/right orientation of the audio playback might be determined from the relative position of another wearable device or computing device operated by the human user (e.g. a smart watch, the audio source itself); further, the user may be asked to perform an action on a certain speaker (the right (or the left) speaker), in order to determine which one is the right (or left) ear for orientation purposes. With these or other orientation detection techniques, the headset device may operate as an audio device that automatically detects and switches channel orientation based on user activity.

Although many of the preceding examples were described with reference to audio playback functions (such as pausing or stopping playback, or increasing/decreasing volume), it will be understood that other variations may affect audio recording and capture functions (such as muting or stopping recording), video playback and capture functions (such as for a videoconference or media player application), and like contextual interactivity functions with a user.

Figure 8:
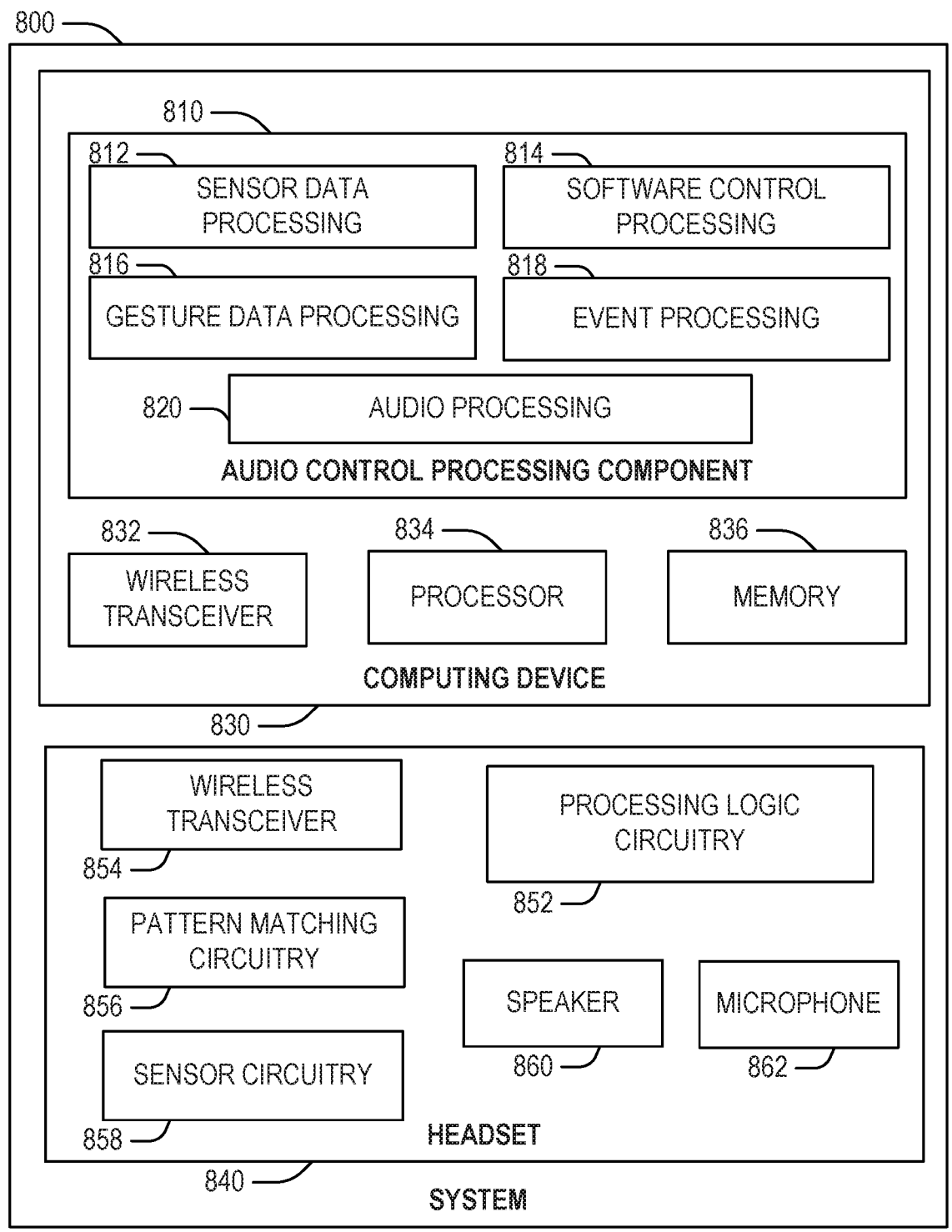
FIG. 8 illustrates a block diagram for an example system including a headset device and computing device, configured to implement automated audio input/output control, according to an example.

FIG. 8 is a block diagram illustrating an example system 800 including a computing device 830 and a headset 840, implementing circuitry and structural electronic components that may be configured for implementation of the techniques described herein. In accordance with the previous described configurations, the system 800 may include devices that are operably coupled (e.g., communicatively coupled) with one another, and it will be understood that additional components (other wearable devices, sensors, and processing components) may be integrated at a variety of locations in the system. Further, the capabilities of system 800 may be integrated into a smart headset that includes features of the computing device 830 and the headset 840 within a single apparatus (e.g., a "smart" headphone that is able to play music and process sensor data and gestures within the same unit).

The computing device 830 is depicted as including an audio control processing component 810, in addition to a wireless transceiver 832, a processor 834 (e.g., a CPU), and a memory 836 (e.g., volatile or non-volatile memory). In an example, the audio control processing component 810 may be provided from specialized hardware operating independent from the processor 834 and the memory 836; in other examples, the audio control processing component 810 may be software-configured hardware that is implemented with use of the processor 834 and the memory 836 (e.g., by instructions executed by the processor 834 and the memory 836).

The headset 840 is depicted as including: a speaker 860, a microphone 862, processing logic circuitry 852, a wireless transceiver 854, pattern matching circuitry 856, and sensor circuitry 858. For example, the processing logic circuitry 852 may be used to implement audio control adjustments with the headset output (e.g., volume control, muting, reversing output orientation); the wireless transceiver 854 may be used to transmit audio and control information with the computing device wireless transceiver 832; the pattern matching circuitry 856 may be used to detect conditions from respective sensors of the headset 840; and the sensor circuitry 858 may be used to control and capture data from the respective sensors of the headset 840.

The audio control processing component 810 may include respective processing components, such as implemented through specially configured hardware (including with specialized circuitry or with software executed with use of the processor 834 and memory 836), to perform sensor data processing 812 (e.g., to evaluate data from various headset, wearable, and computing device sensors), software control processing 814 (e.g., to control audiovisual software applications that provide audio inputs and outputs on the computing device and headset), gesture data processing 816 (e.g., to detect, process, and implement controls from gestures received with the headset 840 or other wearable devices), event processing 818 (e.g., to process and respond to events transmitted from the headset 840 or other wearable devices), and audio processing 820 (e.g., to effect automated audio control effects based on the processing techniques discussed throughout this disclosure).

Although many of the previous examples were provided with reference to wireless communication techniques such as a Bluetooth, IEEE 802.11, or other RF connection between the wireless transceivers 832, 854, it will be understood that other radio frequency communications and protocols may be provided to communicate the audio and data among these and other devices. Additionally, the audio and computing devices discussed herein may be paired with other speakers, microphones, audio receiver systems, and the like, in a variety of configurations.

Figure 9:
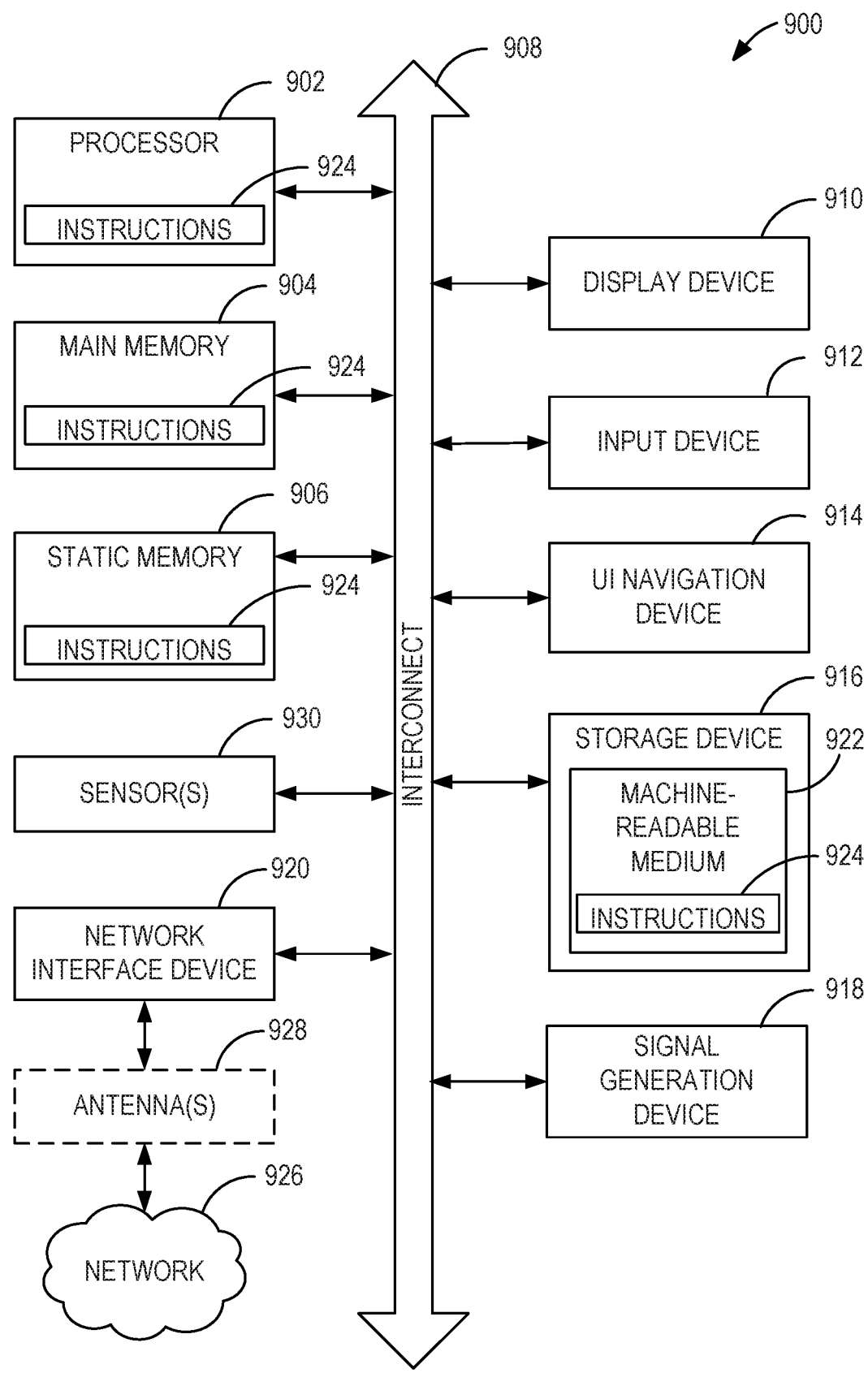
FIG. 9 illustrates a block diagram for an example computer system architecture upon which any one or more of the techniques (e.g., operations, processes, methods, and methodologies) discussed herein may be performed, according to an example.

FIG. 9 is a block diagram illustrating a machine in the example form of a computing system (e.g., computing device) 900, within which a set or sequence of instructions may be executed to cause the machine to perform any one of the methodologies discussed herein, according to an example embodiment. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via an interconnect 908 (e.g., a link, a bus, etc.). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), an output controller 932, a network interface device 920 (which may include or operably communicate with one or more antennas 928, transceivers, or other wireless communications hardware), and one or more sensors 930, such as a global positioning system (GPS) sensor, compass, accelerometer, location sensor, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 via an antenna 928 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a wearable apparatus, comprising: at least one sensor; at least one speaker to output audio received from a remote device; and processing circuitry to perform operations that: collect sensor data from the at least one sensor; determine, from the sensor data, that the sensor data is produced from a positioning of the wearable apparatus on a human user; detect a condition, based on the sensor data that is produced from the positioning of the wearable apparatus, to change the audio to be output with the at least one speaker; and transmit data to the remote device, based on the condition, to control playback of the audio to be output from the at least one speaker.

In Example 2, the subject matter of Example 1 optionally includes wherein the operations to collect sensor data from the at least one sensor cause the wearable apparatus to collect sensor data from at least two environmental sensors, and wherein the operations to detect the condition to change the audio cause the wearable apparatus to detect the condition from a comparison of data obtained from the at least two environmental sensors to a predefined condition.

In Example 3, the subject matter of any one or more of Examples 1-2 optionally include wherein the wearable apparatus is an audio headset, wherein the operations to detect the condition to change the audio to be output include detection of a partial removal of the audio headset from the human user or detection of a complete removal of the audio headset from the human user, and wherein the operations to transmit data to the remote device include operations that: transmit a first command to pause the output of the audio at an electronic device that provides the audio to the wearable apparatus, in response to the partial removal of the audio headset from the human user, and transmit a second command to stop the output of the audio at the electronic device that provides the audio to the wearable apparatus, in response to the complete removal of the audio headset from the human user.

In Example 4, the subject matter of any one or more of Examples 1-3 optionally include wherein the remote device is a computing device and wherein the audio received from the remote device is generated by the computing device, and wherein the computing device implements operations to control the playback of the audio from an audiovisual software program executing on the computing device in response to the condition.

In Example 5, the subject matter of Example 4 optionally includes a wireless transceiver; wherein the operations to transmit the data to the remote device are performed via a communication sent to the computing device with the wireless transceiver.

In Example 6, the subject matter of any one or more of Examples 1-5 optionally include wherein the at least one sensor is an environmental sensor, the at least one sensor including at least one of: an accelerometer, a gyroscope, a strain gauge, a proximity sensor, or a temperature sensor.

In Example 7, the subject matter of any one or more of Examples 1-6 optionally include wherein the at least one sensor is a capacitive sensor, wherein the operations to detect the condition to change the audio to be output include operations to detect a gesture made by the human user in proximity to the capacitive sensor, and wherein the gesture corresponds to a predefined operation to change the audio to be output.

In Example 8, the subject matter of any one or more of Examples 1-7 optionally include wherein the processing circuitry is provided by a microcontroller unit, wherein the operations to detect the condition to change the audio to be output are performed at least in part by pattern matching performed on the sensor data with the microcontroller unit, and wherein the microcontroller unit is adapted to communicate an event to a device driver of a computing device connected to the wearable apparatus, to control the playback of the audio that is provided from the computing device to the wearable apparatus using the device driver.

In Example 9, the subject matter of Example 8 optionally includes wherein the audio to be output originates from a media player software application executing on the computing device, wherein the wearable apparatus is a headset adapted for connection to the computing device, and wherein the operations to transmit data to the remote device include operations to communicate the event to the computing device to cause control of the media player software application.

In Example 10, the subject matter of any one or more of Examples 1-9 optionally include wherein the wearable apparatus is a headset adapted to be worn by the human user, wherein the at least one speaker includes a left speaker to output a left audio channel and a right speaker to output a right audio channel, and wherein, in response to the sensor data indicating an orientation of the headset worn by the human user that provides the left speaker over the human user's right ear and the right speaker over the human user's left ear, the operations to control the playback of the audio to be output include reversal of the left audio channel and the right audio channel to cause output of the left audio channel with the right speaker and output of the right audio channel with the left speaker.

Example 11 is a computing device, comprising: processing circuitry; and an audio control processing component, operable with the processing circuitry, to: receive sensor data collected from an integrated sensor of a headset audio device; detect a condition of the headset audio device using the sensor data; identify a control action in a software application based on the detected condition, wherein the software application generates an output of audio to the headset audio device; and control the output of audio with the software application based on the identified control action.

In Example 12, the subject matter of Example 11 optionally includes a wireless transceiver to wirelessly communicate with the headset audio device via a wireless connection, wherein the output of audio to the headset audio device is provided over the wireless connection, and wherein the wireless connection is established according to a RF, Bluetooth, or IEEE 802.11 communication standard.

In Example 13, the subject matter of any one or more of Examples 11-12 optionally include a communication bus to communicate with the headset audio device via a wired connection, wherein the wired connection is established according to a USB standard, wherein the output of audio to the headset audio device is provided over the wired connection, and wherein the sensor data is communicated from the headset audio device to the computing device via the wired connection.

In Example 14, the subject matter of any one or more of Examples 11-13 optionally include the audio control processing component further to: perform event processing of an event received from the headset audio device.

In Example 15, the subject matter of any one or more of Examples 11-14 optionally include the audio control processing component further to: perform gesture data processing on gesture data indicated in the sensor data; and perform the control action based on the gesture data processing.

In Example 16, the subject matter of any one or more of Examples 11-15 optionally include the audio control processing component further to: receive additional sensor data collected from a wearable device; wherein operations to detect the condition for control of the headset audio device are further based on the additional sensor data.

In Example 17, the subject matter of any one or more of Examples 11-16 optionally include wherein the headset audio device includes a speaker to output audio from the computing device and a microphone to record audio to be communicated to the computing device, and wherein the control action in the software application includes a first control action to control the audio to be output from the speaker and a second control action to control audio to be recorded from the microphone.

Example 18 is a system, comprising: a headset, comprising: at least one sensor; at least one speaker to output audio; communication circuitry; processing circuitry to: collect sensor data from the at least one sensor; and communicate the sensor data via the communication circuitry; and a computing device, comprising: processing circuitry to: receive the sensor data from the headset; detect a condition for headset control based on the sensor data; and identify a software control action for a software application of the computing device based on the detected condition; wherein the computing device controls the software application based on the identified software control action, to cause a modification of audio provided from an audiovisual software program executing on the computing device to the headset that is to be output with the at least one speaker.

In Example 19, the subject matter of Example 18 optionally includes wherein the headset further comprises at least one microphone, and wherein the processing circuitry of the headset is further to control input of the audio with the at least one microphone based on the identified software control action.

In Example 20, the subject matter of any one or more of Examples 18-19 optionally include a wearable device; wherein the computing device receives the sensor data from the wearable device.

Example 21 is a wearable headset apparatus configured to be coupled to a computing device, the wearable headset apparatus comprising: a flexible headphone band; a microphone coupled to the flexible headphone band, the microphone to capture audio to be transmitted to the computing device; a first headphone speaker coupled to a first end of the flexible headphone band and a second headphone speaker coupled to a second end of the flexible headphone band, the first headphone speaker and the second headphone speaker to output audio received from the computing device; a strain gauge embedded within the flexible headphone band, the strain gauge to provide data indicating a position of the flexible headphone band; and circuitry to: transmit audio from the microphone to the computing device; receive audio from the computing device and output the audio with the first headphone speaker and the second headphone speaker; detect a condition, based on the data of the strain gauge, to change a playback or a recording of the audio at the computing device; and transmit data to the computing device, based on the condition, to change the playback or the recording of the audio at the computing device.

In Example 22, the subject matter of Example 21 optionally includes a temperature sensor embedded within the wearable headset apparatus, the temperature sensor to provide data that indicates whether the wearable headset apparatus is worn by a human user; wherein the circuitry is further to detect the condition based on the data of the temperature sensor that indicates whether the wearable headset apparatus is worn by a human user.

In Example 23, the subject matter of any one or more of Examples 21-22 optionally include wherein the position of the flexible headphone band corresponds to a position when the flexible headphone band is moved from a worn orientation to an unworn orientation on a human user, and wherein the condition is to change the playback of the audio at the computing device by causing the computing device to mute the audio to be output with the first headphone speaker and the second headphone speaker.

In Example 24, the subject matter of any one or more of Examples 21-23 optionally include wherein the position of the flexible headphone band corresponds to a position when the flexible headphone band is moved from a fully worn orientation to a partially worn orientation on a human user, and wherein the condition is to change the playback of the audio at the computing device by causing the computing device to reduce a volume of the audio to be output with the first headphone speaker and the second headphone speaker.

In Example 25, the subject matter of Example 24 optionally includes wherein the position of the flexible headphone band corresponds to a position when the flexible headphone band is moved from a partially worn orientation to a fully worn orientation on a human user, and wherein the condition is to change the playback of the audio at the computing device by causing the computing device to increase a volume of the audio to be output with the first headphone speaker and the second headphone speaker.

In Example 26, the subject matter of any one or more of Examples 21-25 optionally include wherein the position of the flexible headphone band corresponds to a position when the flexible headphone band is moved from a worn orientation to an unworn orientation on a human user, and wherein the condition is to change the recording of the audio at the computing device by causing the computing device to mute the audio to be received from the microphone.

Example 27 is at least one device readable storage medium, comprising a plurality of instructions that, responsive to being executed with circuitry of a headset device, cause the headset device to perform operations that: collect sensor data from at least one sensor; detect a condition, based on the sensor data, to change audio to be output from at least one speaker of the headset device; and transmit data to a remote device that provides the audio to the headset device, based on the condition, to control a playback of the audio to be output from the at least one speaker.

In Example 28, the subject matter of Example 27 optionally includes wherein the operations to collect sensor data from the at least one sensor cause the headset device to collect sensor data from at least two environmental sensors, and wherein the operations to detect the condition to change the audio cause the headset device to detect the condition from a comparison of data from the at least two environmental sensors to a predefined condition.

In Example 29, the subject matter of any one or more of Examples 27-28 optionally include wherein the operations to detect the condition to change the audio to be output include detection of a partial removal of the headset device from a human user or detection of a complete removal of the headset device from the human user, and wherein the operations to transmit data to the remote device include operations that: transmit a first command to pause the output of the audio at an electronic device providing the audio, in response to the partial removal of the headset device from the human user, and transmit a second command to stop the output of the audio at the electronic device providing the audio, in response to the complete removal of the headset device from the human user.

In Example 30, the subject matter of any one or more of Examples 27-29 optionally include wherein the remote device is a computing device and wherein the audio received from the remote device is generated by the computing device, and wherein the computing device implements operations to control the playback of the audio from an audiovisual software program executing on the computing device in response to the condition.

In Example 31, the subject matter of Example 30 optionally includes wherein the operations to transmit the data to the remote device are performed via a wireless or wired connection with the computing device.

In Example 32, the subject matter of any one or more of Examples 27-31 optionally include wherein the sensor data obtained from the at least one sensor is provided by an environmental sensor, the environmental sensor including at least one of: an accelerometer, a gyroscope, a strain gauge, a proximity sensor, or a temperature sensor.

In Example 33, the subject matter of any one or more of Examples 27-32 optionally include wherein the sensor data obtained from the at least one sensor is provided by a capacitive sensor, wherein the operations to detect the condition to control the audio to be output include operations to detect a gesture made by a human user in proximity to the capacitive sensor, and wherein the gesture corresponds to a predefined operation to control the audio to be output.

In Example 34, the subject matter of any one or more of Examples 27-33 optionally include wherein the headset device includes a microcontroller unit to perform pattern matching and communication with a computing device that is communicatively coupled to the headset device, wherein the operations to detect the condition to control the audio to be output are performed at least in part by pattern matching performed on the sensor data with the microcontroller unit, and wherein the microcontroller unit is adapted to communicate an event to a device driver of the computing device communicatively coupled to the headset device, to cause control of the audio that is provided from the computing device to the headset device using the device driver.

In Example 35, the subject matter of any one or more of Examples 27-34 optionally include wherein the audio to be output originates from a media player software application executing on a computing device connected to the headset device, and wherein the operations to control the audio to be output from the at least one speaker based on the condition cause the headset device to communicate an event to the computing device to cause control of the media player software application.

Example 36 is at least one machine readable storage medium, comprising a plurality of instructions that, responsive to being executed with circuitry of a computing device, cause the computing device to perform operations that: receive sensor data collected from an integrated sensor of an audio output device; detect a condition for control of the audio output device from the sensor data; identify a control action in a software application based on the detected condition, wherein the software application generates an output of audio to the audio output device; and control the output of audio with the software application based on the identified control action.

In Example 37, the subject matter of Example 36 optionally includes wherein the plurality of instructions further to cause the computing device to perform operations that: wirelessly communicate with the audio output device via a wireless connection, wherein the output of audio to the audio output device is provided over the wireless connection, and wherein the wireless connection is established according to a RF, Bluetooth, or IEEE 802.11 communication standard.

In Example 38, the subject matter of any one or more of Examples 36-37 optionally include wherein the plurality of instructions further to cause the computing device to perform operations that: communicate with the audio output device via a wired connection, wherein the wired connection is established according to a USB standard.

In Example 39, the subject matter of any one or more of Examples 36-38 optionally include wherein the plurality of instructions further to cause the computing device to perform operations that: perform event processing of an event received from the audio output device.

In Example 40, the subject matter of any one or more of Examples 36-39 optionally include wherein the plurality of instructions further to cause the computing device to perform operations that: perform gesture data processing on gesture data indicated in the sensor data, the gesture data obtained from a capacitive sensor of the audio output device; and perform the control action based on the gesture data processing.

In Example 41, the subject matter of any one or more of Examples 36-40 optionally include wherein the plurality of instructions further to cause the computing device to perform operations that: receive additional sensor data collected from a wearable device; wherein the operations to detect the condition for control of the audio output device are further based on the additional sensor data.

In Example 42, the subject matter of any one or more of Examples 36-41 optionally include wherein the audio output device includes a speaker to output audio from the computing device and a microphone to record audio to be communicated to the computing device, and wherein the control action in the software application includes a first control action to control the audio to be output from the speaker and a second control action to control the audio to be recorded from the microphone.

In Example 43, the subject matter of any one or more of Examples 36-42 optionally include wherein the sensor data is environmental data provided from at least one environmental sensor of the audio output device, the at least one environmental sensor including at least one of: an accelerometer, a gyroscope, a strain gauge, a proximity sensor, or a temperature sensor.

In Example 44, the subject matter of any one or more of Examples 36-43 optionally include wherein the sensor data is capacitive sensor data provided from at least one capacitive sensor of the audio output device, wherein the operations to detect the condition for control of the audio output device include operations to detect a gesture made by a human user in proximity to the capacitive sensor, and wherein the gesture corresponds to an audio control operation used to control the output of audio with the software application.

Example 45 is a method comprising electronic operations, which when performed by circuitry of a headset device, causes the headset device to perform the electronic operations including: collecting sensor data from at least one sensor; detecting a condition, based on the sensor data, to change audio to be output from at least one speaker of the headset device; and transmitting data to a remote device that provides the audio to the headset device, based on the condition, to control a playback of the audio to be output from the at least one speaker.

In Example 46, the subject matter of Example 45 optionally includes wherein collecting sensor data from the at least one sensor causes the headset device to collect sensor data from at least two environmental sensors, and wherein detecting the condition to change the audio causes the headset device to detect the condition from a comparison of data from the at least two environmental sensors to a predefined condition.

In Example 47, the subject matter of any one or more of Examples 45-46 optionally include wherein detecting the condition to change the audio to be output includes detection of a partial removal of the headset device from a human user or detection of a complete removal of the headset device from the human user, and wherein transmitting data to the remote device includes: transmitting a first command to pause the output of the audio at an electronic device providing the audio, in response to the partial removal of the headset device from the human user, and transmitting a second command to stop the output of the audio at the electronic device providing the audio, in response to the complete removal of the headset device from the human user.

In Example 48, the subject matter of any one or more of Examples 45-47 optionally include wherein the remote device is a computing device and wherein the audio received from the remote device is generated by the computing device, and wherein the computing device implements operations to control the playback of the audio from an audiovisual software program executing on the computing device in response to the condition.

In Example 49, the subject matter of Example 48 optionally includes wherein transmitting the data to the remote device is performed via a wireless or wired connection with the computing device.

In Example 50, the subject matter of any one or more of Examples 45-49 optionally include wherein the sensor data obtained from the at least one sensor is provided by an environmental sensor, the environmental sensor including at least one of: an accelerometer, a gyroscope, a strain gauge, a proximity sensor, or a temperature sensor.

In Example 51, the subject matter of any one or more of Examples 45-50 optionally include wherein the sensor data obtained from the at least one sensor is provided by a capacitive sensor, wherein detecting the condition to control the audio to be output includes detecting a gesture made by a human user in proximity to the capacitive sensor, and wherein the gesture corresponds to a predefined operation to control the audio to be output.

In Example 52, the subject matter of any one or more of Examples 45-51 optionally include wherein the headset device includes a microcontroller unit to perform pattern matching and communication with a computing device that is communicatively coupled to the headset device, wherein detecting the condition to control the audio to be output is performed at least in part by pattern matching performed on the sensor data with the microcontroller unit, and wherein the microcontroller unit is adapted to communicate an event to a device driver of the computing device communicatively coupled to the headset device, to cause control of the audio that is provided from the computing device to the headset device using the device driver.

In Example 53, the subject matter of any one or more of Examples 45-52 optionally include wherein the audio to be output originates from a media player software application executing on a computing device connected to the headset device, and wherein controlling the audio to be output from the at least one speaker based on the condition includes communicating an event to the computing device to cause control of the media player software application.

Example 54 is a method comprising electronic operations, which when performed by circuitry of a computing device, causes the computing device to perform the electronic operations including: receiving sensor data collected from an integrated sensor of a headset audio device; detecting a condition for control of the headset audio device from the sensor data; identifying a control action in a software application based on the detected condition, wherein the software application generates an output of audio to the headset audio device; and controlling the output of audio with the software application based on the identified control action.

In Example 55, the subject matter of Example 54 optionally includes wirelessly communicating with the headset audio device via a wireless connection, wherein the output of audio to the headset audio device is provided over the wireless connection, and wherein the wireless connection is established according to a RF, Bluetooth, or IEEE 802.11 communication standard.

In Example 56, the subject matter of any one or more of Examples 54-55 optionally include communicating with the headset audio device via a wired connection, wherein the wired connection is established according to a USB standard.

In Example 57, the subject matter of any one or more of Examples 54-56 optionally include performing event processing of an event received from the headset audio device.

In Example 58, the subject matter of any one or more of Examples 54-57 optionally include performing gesture data processing on gesture data indicated in the sensor data, the gesture data obtained from a capacitive sensor of the headset audio device; and performing the control action based on the gesture data processing.

In Example 59, the subject matter of any one or more of Examples 54-58 optionally include processing additional sensor data collected from a wearable device; wherein detecting the condition for control of the headset audio device is further performed based on the additional sensor data.

In Example 60, the subject matter of any one or more of Examples 54-59 optionally include wherein the headset audio device includes a speaker to output audio from the computing device and a microphone to record audio to be communicated to the computing device, and wherein the control action for the software application includes a first control action to control the audio to be output from the speaker and a second control action to control the audio to be recorded from the microphone.

In Example 61, the subject matter of any one or more of Examples 54-60 optionally include wherein the sensor data is environmental data provided from at least one environmental sensor of the headset audio device, the at least one environmental sensor including at least one of: an accelerometer, a gyroscope, a strain gauge, a proximity sensor, or a temperature sensor.

In Example 62, the subject matter of any one or more of Examples 54-61 optionally include wherein the sensor data is capacitive sensor data provided from at least one capacitive sensor of the headset audio device, and wherein detecting the condition for control of the headset audio device includes detecting a gesture made by a human user in proximity to the capacitive sensor, and wherein the gesture correlates to an audio control operation used to control the output of audio with the software application.

Example 63 is a machine readable medium including instructions, which when executed by a computing system, cause the computing system to perform any of the methods of Examples 45-62.

Example 64 is an apparatus comprising means for performing any of the methods of Examples 45-62.

Example 65 is an apparatus, comprising: means for collecting sensor data from at least one sensor; means for detecting a condition, based on the sensor data, to control audio to be output from at least one speaker; and means for transmitting data to a remote device that provides the audio to the apparatus, based on the condition, to control playback of the audio to be output from the at least one speaker.

In Example 66, the subject matter of Example 65 optionally includes means for collecting sensor data from at least two environmental sensors; and means for detecting the condition from a comparison of data from the at least two environmental sensors to a predefined condition, to control the audio.

In Example 67, the subject matter of any one or more of Examples 65-66 optionally include means for detecting a partial removal of the apparatus from a human user or a complete removal of the apparatus from wearing by the human user; means for transmitting a first command to pause the output of the audio at an electronic device providing the audio, in response to the partial removal of the apparatus from wearing by the human user; and means for transmitting a second command to stop the output of the audio at the electronic device providing the audio, in response to the complete removal of the apparatus from wearing by the human user.

In Example 68, the subject matter of any one or more of Examples 65-67 optionally include means for implementing operations to control the output of the audio from an audiovisual software program executing on a computing device in response to the condition, wherein the audio to be output originates from the computing device, and wherein controlling the audio to be output includes communicating the condition to the computing device.

In Example 69, the subject matter of any one or more of Examples 65-68 optionally include means for generating the sensor data obtained from the at least one sensor.

In Example 70, the subject matter of any one or more of Examples 65-69 optionally include means for detecting a gesture made by a human user in proximity to a capacitive sensor, wherein the sensor data obtained from the at least one sensor is provided by the capacitive sensor, and wherein the gesture corresponds to a predefined operation to control the audio to be output.

In Example 71, the subject matter of any one or more of Examples 65-70 optionally include means for performing pattern matching and communication with a computing device that is communicatively coupled to the apparatus, wherein the condition to control the audio to be output is determined at least in part by pattern matching performed on the sensor data; and means for communicating an event to a device driver of the computing device communicatively coupled to the apparatus, to cause control of the audio that is provided from the computing device to the apparatus using the device driver.

In Example 72, the subject matter of any one or more of Examples 65-71 optionally include means for communicating an event to a computing device to cause control of a media player software application, wherein the audio to be output originates from the media player software application executing on the computing device connected to the apparatus.

Example 73 is an apparatus, comprising: means for receiving sensor data collected from an integrated sensor of a headset audio device; means for detecting a condition for control of the headset audio device from the sensor data; means for identifying a control action in a software application based on the detected condition, wherein the software application generates an output of audio to the headset audio device; and means for controlling the output of audio with the software application based on the identified control action.

In Example 74, the subject matter of Example 73 optionally includes means for wirelessly communicating with the headset audio device via a wireless connection, wherein the output of audio to the headset audio device is provided over the wireless connection; and wherein the wireless connection is established according to a RF, Bluetooth, or IEEE 802.11 communication standard.

In Example 75, the subject matter of any one or more of Examples 73-74 optionally include means for communicating with the headset audio device via a wired connection, wherein the wired connection is established according to a USB standard.

In Example 76, the subject matter of any one or more of Examples 73-75 optionally include means for performing event processing of an event received from the headset audio device.

In Example 77, the subject matter of any one or more of Examples 73-76 optionally include means for processing gesture data indicated in the sensor data, the gesture data obtained from a capacitive sensor of the headset audio device; and means for performing the control action based on the processing of the gesture data.

In Example 78, the subject matter of any one or more of Examples 73-77 optionally include means for processing additional sensor data collected from a wearable device, wherein control of the headset audio device is further performed based on the additional sensor data.

In Example 79, the subject matter of any one or more of Examples 73-78 optionally include means for outputting audio and means for recording audio; wherein the control action for the software application includes a first control action to control the audio to be output and a second control action to control the audio to be recorded.

In Example 80, the subject matter of any one or more of Examples 73-79 optionally include means for detecting a gesture made by a human user in proximity to the apparatus, wherein the gesture correlates to an audio control operation used to control the output of audio with the software application.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A wearable apparatus, comprising:
at least one sensor;
at least one speaker to output audio received from a remote device; and
processing circuitry to perform operations that:
collect sensor data from the at least one sensor;
determine, from the sensor data, that the sensor data is produced from a positioning of the wearable apparatus on a human user;
receive additional sensor data collected from a second wearable device worn by the human user, wherein the second wearable device is separate from the wearable apparatus and wherein the additional sensor data includes a heart rate of the human user;
detect a condition, based on the sensor data that is produced from the positioning of the wearable apparatus and the additional sensor data, to change the audio to be output with the at least one speaker; and
transmit data to the remote device, based on the condition, to control playback of the audio to be output from the at least one speaker, wherein the data includes parameters to increase audio volume based on the heart rate exceeding a heart rate threshold.

2. The wearable apparatus of claim 1,
wherein the operations to collect sensor data from the at least one sensor cause the wearable apparatus to collect sensor data from at least two environmental sensors, and
wherein the operations to detect the condition to change the audio cause the wearable apparatus to detect the condition from a comparison of data obtained from the at least two environmental sensors to a predefined condition.

3. The wearable apparatus of claim 1,
wherein the wearable apparatus is an audio headset,
wherein the operations to detect the condition to change the audio to be output include detection of a partial removal of the audio headset from the human user or detection of a complete removal of the audio headset from the human user, and
wherein the operations to transmit data to the remote device include operations that:
transmit a first command to pause the output of the audio at an electronic device that provides the audio to the wearable apparatus, in response to the partial removal of the audio headset from the human user, and
transmit a second command to stop the output of the audio at the electronic device that provides the audio to the wearable apparatus, in response to the complete removal of the audio headset from the human user.

4. The wearable apparatus of claim 1,
wherein the remote device is a computing device and wherein the audio received from the remote device is generated by the computing device, and
wherein the computing device implements operations to control the playback of the audio from an audiovisual software program executing on the computing device in response to the condition.

5. The wearable apparatus of claim 4, further comprising:
a wireless transceiver;
wherein the operations to transmit the data to the remote device are performed via a communication sent to the computing device with the wireless transceiver.

6. The wearable apparatus of claim 1, wherein the at least one sensor is an environmental sensor, the at least one sensor including at least one of:
an accelerometer,
a gyroscope,
a strain gauge,
a proximity sensor, or
a temperature sensor.

7. The wearable apparatus of claim 1,
wherein the at least one sensor is a capacitive sensor,
wherein the operations to detect the condition to change the audio to be output include operations to detect a gesture made by the human user in proximity to the capacitive sensor, and
wherein the gesture corresponds to a predefined operation to change the audio to be output.

8. The wearable apparatus of claim 1,
wherein the processing circuitry is provided by a microcontroller unit,
wherein the operations to detect the condition to change the audio to be output are performed at least in part by pattern matching performed on the sensor data with the microcontroller unit, and
wherein the microcontroller unit is adapted to communicate an event to a device driver of a computing device connected to the wearable apparatus, to control the playback of the audio that is provided from the computing device to the wearable apparatus using the device driver.

9. The wearable apparatus of claim 8,
wherein the audio to be output originates from a media player software application executing on the computing device,
wherein the wearable apparatus is a headset adapted for connection to the computing device, and
wherein the operations to transmit data to the remote device include operations to communicate the event to the computing device to cause control of the media player software application.

10. The wearable apparatus of claim 1,
wherein the wearable apparatus is a headset adapted to be worn by the human user,
wherein the at least one speaker includes a left speaker to output a left audio channel and a right speaker to output a right audio channel, and
wherein, in response to the sensor data indicating an orientation of the headset worn by the human user that provides the left speaker over the human user's right ear and the right speaker over the human user's left ear, the operations to control the playback of the audio to be output include reversal of the left audio channel and the right audio channel to cause output of the left audio channel with the right speaker and output of the right audio channel with the left speaker.

11. At least one device readable storage medium, comprising a plurality of instructions that, responsive to being executed with circuitry of a headset device, cause the headset device to perform operations that:
collect sensor data from at least one sensor;
receive additional sensor data collected from a wearable device, wherein the wearable device is separate from the headset device and wherein the additional sensor data includes a heart rate;
detect a condition, based on the sensor data and the additional sensor data, to change audio to be output from at least one speaker of the headset device; and
transmit data to a remote device that provides the audio to the headset device, based on the condition, to control a playback of the audio to be output from the at least one speaker, wherein the data causes the remote device to increase audio volume based on the heart rate exceeding a heart rate threshold.

12. The device readable storage medium of claim 11,
wherein the operations to collect sensor data from the at least one sensor cause the headset device to collect sensor data from at least two environmental sensors, and
wherein the operations to detect the condition to change the audio cause the headset device to detect the condition from a comparison of data from the at least two environmental sensors to a predefined condition.

13. The device readable storage medium of claim 11,
wherein the operations to detect the condition to change the audio to be output include detection of a partial removal of the headset device from a human user or detection of a complete removal of the headset device from the human user, and
wherein the operations to transmit data to the remote device include operations that:
transmit a first command to pause the output of the audio at an electronic device providing the audio, in response to the partial removal of the headset device from the human user, and
transmit a second command to stop the output of the audio at the electronic device providing the audio, in response to the complete removal of the headset device from the human user.

14. The device readable storage medium of claim 11,
wherein the remote device is a computing device and wherein the audio received from the remote device is generated by the computing device, and
wherein the computing device implements operations to control the playback of the audio from an audiovisual software program executing on the computing device in response to the condition.

15. The device readable storage medium of claim 14,
wherein the operations to transmit the data to the remote device are performed via a wireless or wired connection with the computing device.

16. The device readable storage medium of claim 11,
wherein the sensor data obtained from the at least one sensor is provided by an environmental sensor, the environmental sensor including at least one of:
an accelerometer,
a gyroscope,
a strain gauge,
a proximity sensor, or
a temperature sensor.

17. The device readable storage medium of claim 11,
wherein the sensor data obtained from the at least one sensor is provided by a capacitive sensor,
wherein the operations to detect the condition to control the audio to be output include operations to detect a gesture made by a human user in proximity to the capacitive sensor, and
wherein the gesture corresponds to a predefined operation to control the audio to be output.

18. The device readable storage medium of claim 11,
wherein the headset device includes a microcontroller unit to perform pattern matching and communication with a computing device that is communicatively coupled to the headset device, wherein the operations to detect the condition to control the audio to be output are performed at least in part by pattern matching performed on the sensor data with the microcontroller unit, and wherein the microcontroller unit is adapted to communicate an event to a device driver of the computing device communicatively coupled to the headset device, to cause control of the audio that is provided from the computing device to the headset device using the device driver.

19. The device readable storage medium of claim 11, wherein the audio to be output originates from a media player software application executing on a computing device connected to the headset device, and wherein the operations to control the audio to be output from the at least one speaker based on the condition cause the headset device to communicate an event to the computing device to cause control of the media player software application.

20. A wearable headset apparatus configured to be coupled to a computing device, the wearable headset apparatus comprising:

a flexible headphone band;

a microphone coupled to the flexible headphone band, the microphone to capture audio to be transmitted to the computing device;

a first headphone speaker coupled to a first end of the flexible headphone band and a second headphone speaker coupled to a second end of the flexible headphone band, the first headphone speaker and the second headphone speaker to output audio received from the computing device;

a strain gauge embedded within the flexible headphone band, the strain gauge to provide data indicating a position of the flexible headphone band; and circuitry to:
transmit audio from the microphone to the computing device;
receive audio from the computing device and output the audio with the first headphone speaker and the second headphone speaker;
receive sensor data collected from a wearable device, the wearable device separate from the wearable headset apparatus, wherein the sensor data includes a heart rate;
detect a condition, based on the data of the strain gauge and the sensor data, to change a playback or a recording of the audio at the computing device; and
transmit data to the computing device, based on the condition, to change the playback or the recording of the audio at the computing device, wherein the data includes parameters to increase audio volume based on the heart rate exceeding a heart rate threshold.

21. The wearable headset apparatus of claim 20, further comprising:

a temperature sensor embedded within the wearable headset apparatus, the temperature sensor to provide data that indicates whether the wearable headset apparatus is worn by a human user;

wherein the circuitry is further to detect the condition based on the data of the temperature sensor that indicates whether the wearable headset apparatus is worn by a human user.

22. The wearable headset apparatus of claim 20, wherein the position of the flexible headphone band corresponds to a position when the flexible headphone band is moved from a worn orientation to an unworn orientation on a human user, and wherein the condition is to change the playback of the audio at the computing device by causing the computing device to mute the audio to be output with the first headphone speaker and the second headphone speaker.

23. The wearable headset apparatus of claim 20, wherein the position of the flexible headphone band corresponds to a position when the flexible headphone band is moved from a fully worn orientation to a partially worn orientation on a human user, and wherein the condition is to change the playback of the audio at the computing device by causing the computing device to reduce the audio volume to be output with at least one of: the first headphone speaker or the second headphone speaker.

24. The wearable headset apparatus of claim 23, wherein the position of the flexible headphone band corresponds to a position when the flexible headphone band is moved from a partially worn orientation to a fully worn orientation on a human user, and wherein the condition is to change the playback of the audio at the computing device by causing the computing device to increase the audio volume to be output with at least one of: the first headphone speaker or the second headphone speaker.

25. The wearable headset apparatus of claim 20, wherein the position of the flexible headphone band corresponds to a position when the flexible headphone band is moved from a worn orientation to an unworn orientation on a human user, and wherein the condition is to change the recording of the audio at the computing device by causing the computing device to mute the audio to be received from the microphone.

* * * * *